United States Patent [19]

Hall

[11] 4,243,350
[45] Jan. 6, 1981

[54] WINCH LOAD FASTENING APPARATUS

[76] Inventor: Robert E. Hall, 3760 Olmsby Dr., Kent, Ohio 44240

[21] Appl. No.: 875,636

[22] Filed: Feb. 6, 1978

Related U.S. Application Data

[63] Continuation-in-part of Ser. No. 658,409.

[51] Int. Cl.³ .................. B60P 7/08; B61D 45/00; B65D 63/00; B66D 1/04
[52] U.S. Cl. .................. 410/100; 242/107.2; 188/65.2; 410/103
[58] Field of Search .............. 24/191; 105/469, 470, 105/471, 472, 477; 254/161, 164; 410/100, 103

[56] References Cited

U.S. PATENT DOCUMENTS

| | | | |
|---|---|---|---|
| 2,449,600 | 9/1948 | Geiger | 105/469 |
| 2,715,008 | 8/1955 | Huber | 105/477 |
| 3,054,151 | 9/1962 | Shankland | 105/469 X |
| 3,678,542 | 7/1972 | Prete, Jr. | 24/191 |
| 3,697,045 | 10/1972 | Farley | 105/477 X |
| 4,054,267 | 10/1977 | Berg et al. | 105/477 X |
| 4,072,257 | 2/1978 | Hall | 105/469 X |

*Primary Examiner*—Howard Beltran
*Attorney, Agent, or Firm*—Mack D. Cook, II

[57] ABSTRACT

Apparatus for applying a releasable tension to an anchored strap extended over, or connected to, a load carried on a platform. The apparatus comprises a housing, a torsion element for strap recoil, a winching rotor for operatively interconnecting the torsion element and the inboard end of the strap, and a nonincremental clamping assembly for releasably engaging the middle of a strap between the ends. Tension is first supplied to the anchored strap by action of the torsion element on the rotor. Thereafter, further tension is applied to the anchored strap by a winching force applied to the rotor. The tension of the anchored strap is maintained by engagement of the clamping assembly with the strap.

3 Claims, 6 Drawing Figures

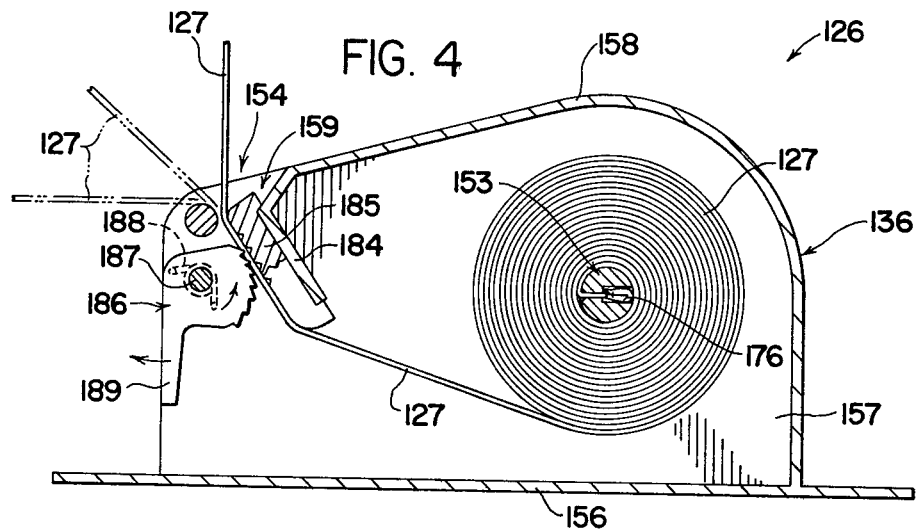
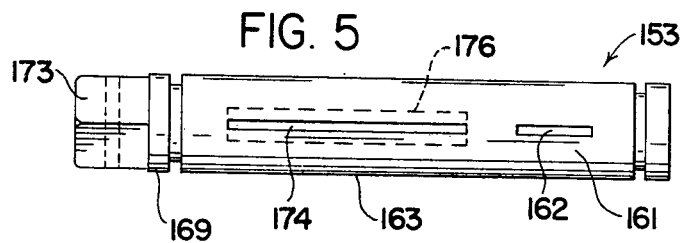
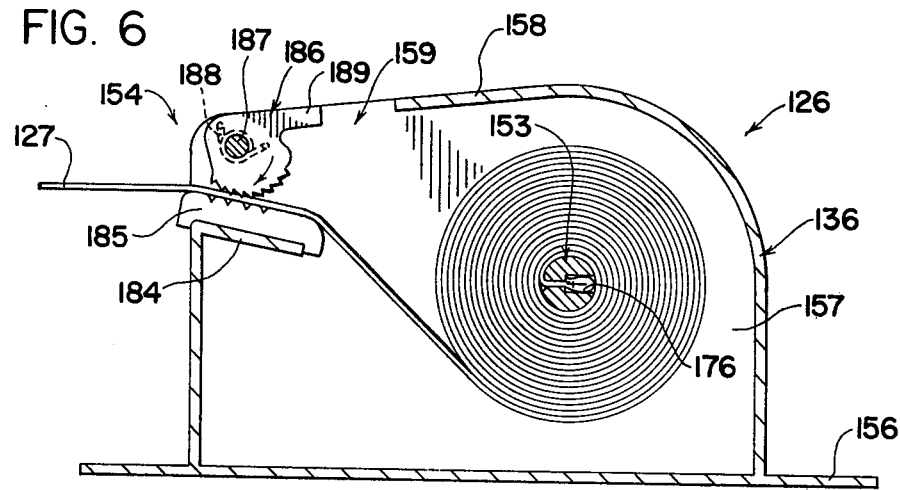

1

WINCH LOAD FASTENING APPARATUS

BACKGROUND OF THE INVENTION

This application is a continuation-in-part of U.S. Application Ser. No. 658,409, filed Feb. 17, 1976, issued as U.S. Pat. No. 4,072,257 Feb. 7, 1978.

The present invention relates to apparatus for applying a releasable tension to an anchored strap in contact with, when extended over, or connected to, a load carried on a platform. In the prior application, elements of the apparatus of the invention are used in combination with a load carrying apparatus selectively attachable to a vehicle for carrying a load on a platform. it has now been found that the apparatus of the invention also has great utility and value when used in environments and applications other than the load carrying apparatus of the prior application.

A load fastening apparatus is not new. Since time immemorial, men and women have coped with problems of transporting things from place to place. Particularly relevant prior art includes U.S. Pat. No. 2,449,600, September, 1948, Geiger; U.S. Pat. No. 3,054,151, September, 1962, Shankland; and, U.S. Pat. No. 3,697,045, October, 1972, Farley. These patents disclose portable and self-contained tie-down devices and apparatus which, while no doubt effective, do not permit of the operating advantages provided by the present invention. U.S. Pat. No. 3,678,542, July, 1952, Prete, Jr., is pertinent to the clamping means of an apparatus according to the invention.

A tie-down device, fastening winch or apparatus according to the invention will operatively function in virtually any operating mode. The components are not readily subject to damage by external forces. Of particular value to a user is the ability to position a load or cargo on a platform, initially anchor the strap in contact, with when over or connected to the load, make such adjustments in position of strap and load as are required, and finally to fully and non-incrementally tighten the straps and secure the load relative to the platform. All this, with the additional advantages of convenient unfastening, extraction or retraction of the apparatus fastening straps.

SUMMARY OF THE INVENTION

The object of the invention is to provide an improved apparatus for applying a releasable tension to an anchored strap extended over, or connected to, a load carried on a platform.

It is a further object of the invention to provide a tie-down device, fastening winch or apparatus which will operatively function in virtually any operating mode, having components which are not readily subject to damage by external forces, and which will enable the user to correctly position and adjust the load on the platform prior to non-incremental final tightening of the fastening straps.

These and other objects of the invention, and further advantages thereof, will be apparent in view of the description of two embodiments thereof, as set forth below.

In general, a load fastening apparatus according to the invention is used on a platform and for applying a releasable tension to a strap anchored at the outer end when securing a load on the platform. The apparatus has a housing for a coiled strap. The housing has a base element adapted for attachment to the platform, opposed side plates, and a conforming cover plate having an opening therethrough for reciprocal movement (extraction or retraction, uncoiling or coiling) of the strap. The apparatus further has a torsion element with the housing providing a torque for strap recoil into the housing.

The apparatus according to the invention also has a unitary elongated rotatable winching rotor extending transversely of the housing and coaxially through the torsion element. The rotor has, (i) means for the connection of the inboard end of the strap thereto, and (ii) means for the connection of the torsion element thereto, and (iii) means for applying a torque thereto from externally of the housing. The apparatus further has a strap clamping means through which the strap may be tensioned and pulled into the housing solely by a rotation of the rotor. The strap clamping means will lock the strap against extractive movement from within the housing until manually actuated (by the user) to release the strap. The apparatus functions so that an anchored strap is tensioned and pulled into the housing, during a first phase of strap tightening, by the action of the torsion element on the rotor. Then, the anchored strap is tensioned and pulled into the housing, the second or final tightening phase, by an external torque applied (by the user) to the rotor. All tension applied to the anchored strap by rotation of the rotor is maintained until manual actuation of the clamping means.

DESCRIPTION OF THE DRAWINGS

FIG. 4 is a sectional view, taken substantially as indicated on line 4—4 of FIG. 2;

FIG. 5 is a detached view showing details of a winching rotor for the apparatus; and, FIG. 6 is a sectional view, similar to FIG. 4, of a second embodiment of an apparatus according to the invention.

DETAILED DESCRIPTION OF THE INVENTION

Figure 1:
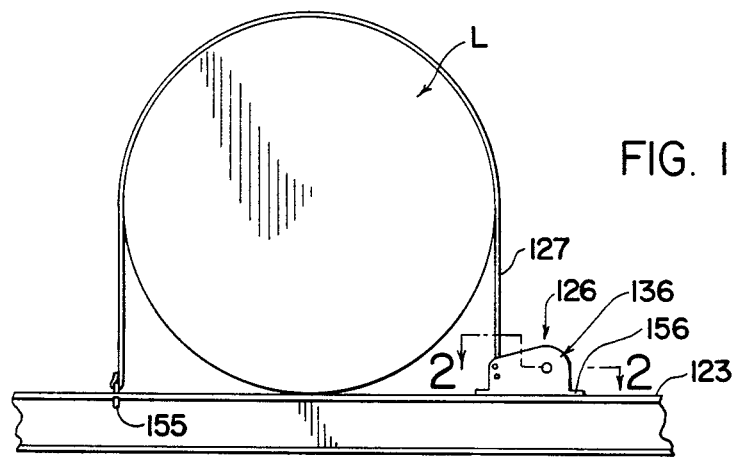
FIG. 1 is a schematic view showing a load fastening apparatus with an anchored strap extending over a load on a platform.

In the prior co-pending application which issued Feb. 7, 1978, as U.S. Pat. No. 4,072,257, a load fastening apparatus embodying subject matter concepts according to the invention is described as a "fastening assembly referred to generally by the numeral 26." The fastening assembly 26 is used in the environment of "load carrying apparatus" (20) selectively attachable to a "vehicle" (21) for carrying a "load" (L) on a "platform" (23).

In this specification and drawings, a load carrying apparatus or fastening assembly is referred to generally by the numeral 126. The apparatus 126 is intended for use on a platform referred to generally by the numeral 123 and for applying a releasable tension to an anchored strap 127 in contact with, when extended over, or connected to, a load indicated at L carried on the platform 123. The strap 127 may be of a suitable fabric or woven composition having a high tensile strength or breaking point.

As shown, an apparatus 126 has as the primary components thereof: a housing indicated at 136 for the coiled strap 127 and the other primary components of an apparatus 126; a torsion element indicated at 152 providing a means for strap recoil; a winching rotor indicated at 153 for operatively interconnecting the strap 127 and the torsion means 152 relative to each other and to an external torque source; and, a clamping assembly indicated at 154 providing a non-incremental means for releasably engaging the middle of a strap 127 between the ends. The outboard end of the strap 127 carries a suitable anchoring means such as an S-shaped hook 155.

A housing 136 includes a base plate 156 adapted for attachment, as by bolting (not shown), to a platform 123. The orientation plane of a platform 123, whether horizontal, vertical or inclined, is not critical because an apparatus 126 will operatively function in virtually any mounting mode. The structurally integral housing 136 is further defined by spaced-apart or opposed side plates 157 and a conforming cover plate 158. The cover plate 158 has an opening therethrough, indicated at 159, suitably shaped for linear alignment of the strap 127 during reciprocal movement, extraction or retraction, within the housing 136.

Figure 2:
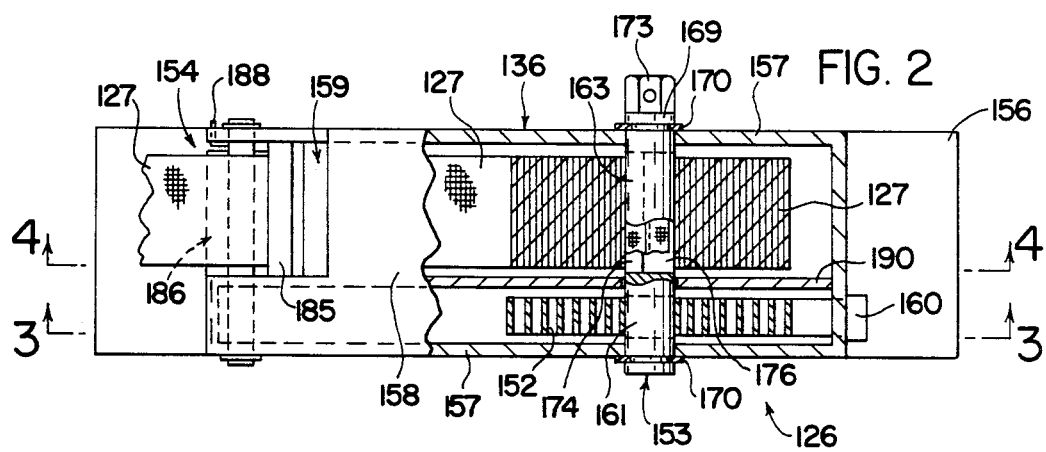
FIG. 2 is an enlarged sectional plan view of one embodiment of an apparatus according to the invention, taken substantially as indicated on line 2—2 of FIG. 1.
Figure 3:
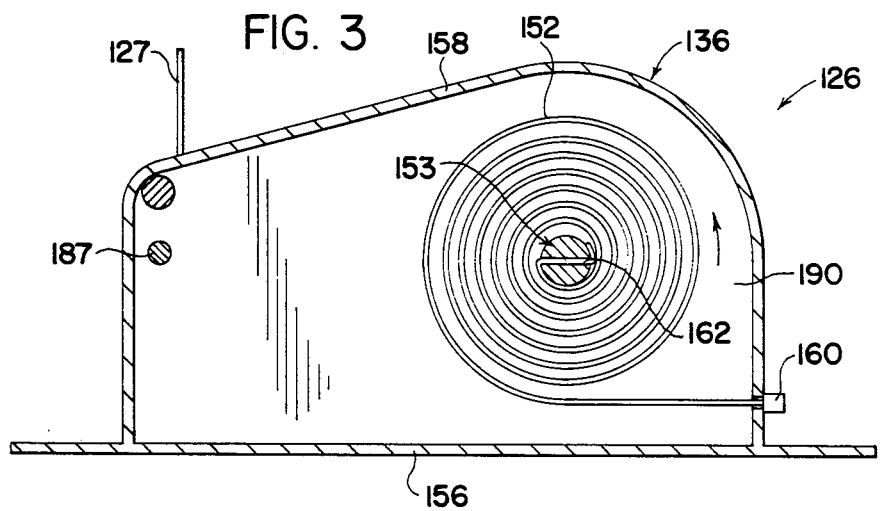
FIG. 3 is a sectional view, taken substantially as indicated on line 3—3 of FIG. 2.

As shown in FIGS. 2 and 3, a torsion element 152 may be fabricated as a flat or band spring which may be wound or coiled to develop an action force. The coiled spring 152 is positioned adjacent one of the side plates 157. The outboard end of the coiled spring 152 is restrained relative to the housing 136, as by insertion through a horizontally oriented slot (not numbered) in the cover plate 158 and a suitable retaining element indicated at 160.

A winching rotor 153 is fabricated as a unitary or one-piece elongated rotatable element extending transversely of the housing 136 and coaxially within the coiled spring 152. As best shown in FIG. 5, the rotor 153 has a connector portion 161 with a flat slot 162 therethrough providing a means for connection of the inboard end of a coiled spring 152 thereto. The rotor 153 further has a medial portion or shank 163 extending from a connector portion 161 toward an opposite side wall 157 providing a means for connection of the inboard end of a coiled strap 127 thereto. The rotor 153 still further has a winch end 169 extending from a shank portion 163 and projecting outwardly through a side wall 157 providing a means for applying a torque thereto from externally of the housing 136. The rotor winch end 169 may be suitably adapted, as by a hexhead 173 and/or a cross-bore, to impart a winching action to the rotor 153 for final tightening of an anchored strap 127, as by use of a wrench or tool (not shown) applied to the rotor end 169.

As best shown in FIG. 2, the rotor 153 is journaled by, or rotates within, aligned bores (not numbered) in the housing side plates 157. The rotor 153 may be longitudinally secured and operatively positioned by suitable snap rings 170.

A strap 127 is wrapped or coiled around the rotor shank portion 163 and connected thereto as by a shouldered slot 174. The slot 174 has a throat (not numbered) dimensioned to receive a single thickness of the strap 127. The throat opens into an enlarged groove portion 176 dimensioned to receive a double thickness of the strap 127, which may be stitched together (as shown). A folded over strap end, preferably stitched or with one or more wraps around the rotor shank 163, should not pull free or loose from the rotor 153.

In both embodiments of an apparatus 126 as shown, a non-incremental clamping means 154 is positioned within the housing 136 adjacent the cover plate opening 159 and in linear alignment with the coiled strap 127. The clamping means 154 must be such as to have an unrestricted clamp locus so as to engage the strap 127 at any position between its ends. A clamp means 154 includes a cross-plate 184 carrying a base or jaw pad 185 with serrated strap engaging surfaces. Opposed to the clamp pad 185, a pivotable cam pawl 186 with serrated strap engaging surfaces is mounted on a support pin 187. A torsion spring 188 positioned coaxially of the support pin 187 normally biases the cam pawl 186 toward the clamp pad 185 for holding the strap in clamping engagement between the opposed serrated surface when the strap 127 is being tensioned for extractive movement from within or out of the housing 136. The cam pawl 186 carries an actuating lever 189, pulled outwardly to selectively release the strap 127 from clamping engagement between the serrated surfaces on the clamp pad 185 and the cam pawl 186, permitting extraction of the coiled strap 127 from within the housing 136 for load L fastening.

As shown in FIGS. 2 and 3, a separation plate 190 may be positioned within the housing 136 between the side plates 157 to provide a chamber for a coiled spring 152. The seperation plate 190 must be positioned so as not to contact or restrain the coiled strap 127 in any manner.

SUMMARY

When the load L is on the platform 123, the user actuates the cam pawl lever 189 of the clamping means 154 and extracts or pulls out the strap 127 from the apparatus 126. The coiled strap 127 will unwind (clockwise, as viewed in FIGS. 4 and 6) and a rotative force will be applied to the rotor 153. The rotor 153 will apply a rotative tightening force to the torsion means 152 (clockwise, as viewed in FIGS. 3, 4 and 6). The user will attach the strap hook 155 over the load L to a connection point on the platform 123. Alternatively, when the load configuration and weight permits, the strap hook 155 may be attached to a connection point on the load L.

To remove any slack an initially tighten the anchored strap 127, the user merely releases the strap 127 allowing the torsion means 152 to recoil the strap 127 around the rotor 153 (counterclockwise, as viewed in FIGS. 3, 4 and 6). Thereafter, the user may apply further non-incremental tension to the taut anchored strap, as by use of a wrench (not shown) applied to the rotor hexhead 173 or by a rod (also not shown) inserted in the cross-bore for turning the rotor 153 in a counterclockwise direction as viewed in FIGS. 3, 4 and 6. This external winching force applied to the rotor 153 will further shorten and securely tighten the anchored strap 127 and safely hold the load L on the platform 123.

When the user desires to remove the load L from the platform 123, the cam pawl lever 189 on the clamping means 154 is actuated freeing the strap 127 for a limited extraction from the apparatus 126 so that the strap hook 155 may be unanchored or detached. Thereafter, release of the strap 127 will result in the torsion means 152 acting on the rotor 153 to recoil, retract or rewind the strap 127 into the apparatus 126. Preferably, the torsion means 152 is always tending to recoil the strap 127 into apparatus 126. Therefore, in the event the anchored strap 127 should elongate or stretch, as by exposure to moisture or high humidity, the load L will remain safely held on the platform 123.

What is claimed is:

1. A load fastening apparatus for use on a platform and for applying a releasable tension to a strap anchored at the outer end when securing a load carried on the platform, comprising:

a housing for said strap when coiled, said housing having a base element adapted for attachment to said platform, opposed side plates, and a conforming cover plate having an opening therethrough for reciprocal movement of said strap;

a torsion element within said housing providing a torque for strap recoil into said housing;

a unitary elongated rotatable rotor extending transversely of and journaled in said housing and coaxially through said torsion element, said rotor having, (i) means for the connection of the inboard end of said strap thereto, and (ii) means for the connection of said torsion element thereto, and (iii) means for applying a torque thereto from externally of said housing; and, a strap clamping means having a pivotable cam pawl and through which said strap is tensioned and pulled into said housing solely by a rotation of said rotor, while automatically locking said strap against extractive movement from within said housing until said clamping means is manually actuated to release said strap;

wherein said anchored strap is first tensioned and pulled into said housing by the action of said torsion element on said rotor, and whereby said anchored strap is further tensioned and pulled into said housing by an external torque applied to said rotor.

2. A load fastening apparatus according to claim 1, wherein said torsion means is a coiled spring and said rotor has a shank portion with a shouldered slot, said slot having a throat dimensioned to receive a single thickness of said strap opening into an enlarged groove portion dimensioned to receive a double thickness of said strap, for attaching said strap to said rotor.

3. A load fastening apparatus according to claim 1, wherein said rotor has an end projecting outwardly of said housing with a hexhead for applying a torque thereto.

* * * * *

UNITED STATES PATENT AND TRADEMARK OFFICE
CERTIFICATE OF CORRECTION

PATENT NO. : 4,243,350
DATED : January 6, 1981
INVENTOR(S) : Robert E. Hall

It is certified that error appears in the above-identified patent and that said Letters Patent are hereby corrected as shown below:

Col. 1, line 14, "it" should read --It--.

Col. 1, line 37, delete --in contact, with when--.

Col. 4, line 3, "in both embodiments" should read --In both embodiments--.

Col. 4, line 17, "surface" should read --surfaces--.

Col. 4, line 47, "an initially" should read --and initially--.

Signed and Sealed this

First Day of September 1981

[SEAL]

Attest:

Attesting Officer

GERALD J. MOSSINGHOFF

Commissioner of Patents and Trademarks